(No Model.)
T. A. EDISON.
PROCESS OF MAKING PHONOGRAM BLANKS.
No. 382,417. Patented May 8, 1888.
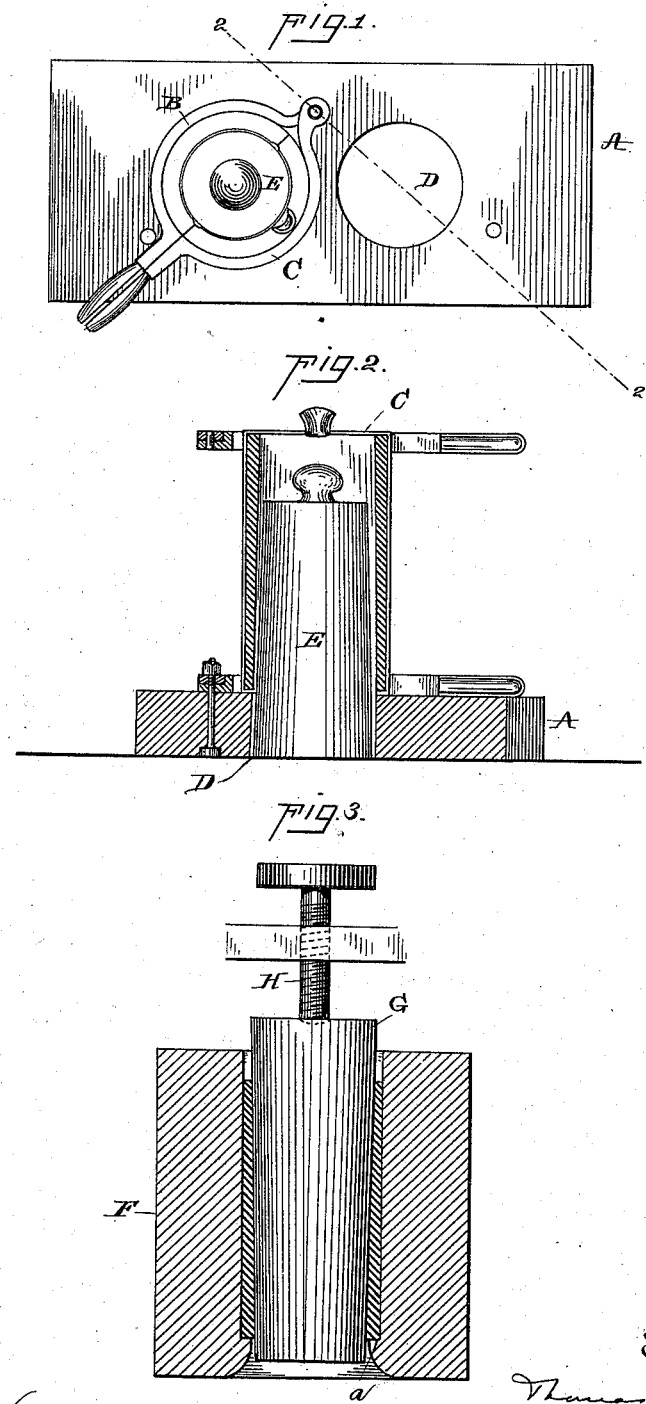

UNITED STATES PATENT OFFICE.

THOMAS A. EDISON, OF LLEWELLYN PARK, NEW JERSEY.

PROCESS OF MAKING PHONOGRAM-BLANKS.

SPECIFICATION forming part of Letters Patent No. 382,417, dated May 8, 1888.

Application filed February 4, 1888. Serial No. 263,047. (No specimens.)

*To all whom it may concern:*

Be it known that I, THOMAS A. EDISON, a citizen of the United States, residing at Llewellyn Park, in the county of Essex and State of New Jersey, have invented a certain new and useful Improvement in Processes of Making Phonogram-Blanks, (Case No. 758,) of which the following is a specification.

The object I have in view is to produce a method or process of making wax phonogram-blanks which will result in a more accurate blank and one having a better surface for receiving the phonograph record.

The blank which I prefer to use is a hollow tapering cylinder; but the process is applicable to blanks of other forms. It is hereinafter described as applied to the tapering cylindrical blanks.

I first mold the wax blank by pouring melted wax into a mold having the necessary shape for producing a hollow tapering cylinder. The molded cylinder is then pressed in a die of highly-polished metal, (preferably speculum metal,) and it is thereby given the exact shape and size desired, both externally and internally, and its surfaces are given a high polish, so that upon the removal of a blank from this die it will be ready for use without any cutting. The blank is removed from the mold and placed in the die while it is still partially plastic—say after its temperature has fallen to about 100° Fahrenheit.

In the accompanying drawings, forming a part hereof, Figure 1 is a top view of the mold. Fig. 2 is a cross-section of the mold on the line 2 2, when the mold is swung to the right; and Fig. 3 is a view, partially in section and partially in elevation, showing the pressing of the blank in the finishing-die.

The mold for molding the cylinder is shown, for convenience, as of the particular construction described in a prior application for patent, (Serial No. 260,923,) although it may be of any other suitable construction. It is composed of a base, A, upon which the mold is pivoted, such mold being composed of two parts, B C, adapted to be separated for opening the mold, and also adapted to be swung bodily upon the base, so as to bring the mold over the opening D in the base or over the solid portion of the base.

E is the tapering core of the mold. The mold is swung to the left over the solid part of the base, and the core being placed in it and the mold closed, hot wax is poured into the mold, forming a cylinder around the core E. When the wax is partially cool, sufficiently so to retain its shape, the mold is swung to the right over the opening D and the core E is pushed down into the opening D, as shown in Fig. 2, thus permitting the wax to contract without breaking. After the cylindrical blank has cooled down to a temperature where it is still slightly plastic—say 100° Fahrenheit—it is removed from the mold and is placed in the die F. This die may be a divided die or one that is solid. It has a cylindrical opening with a shoulder, *a*, at its lower end. A tapering plunger, G, pressed forward by a screw, H, is forced into the bore of the phonogram-blank, pressing the blank against the walls of the surrounding die, and giving it the exact shape and size both externally and internally that it is desired the blank should have. The die and its plunger are made of highly-polished metal. Speculum metal is preferably used for this purpose. The plunger is then removed from the blank and the blank removed from the die, when it will be ready for use on a phonograph. The blank formed in this way is accurate in its size and has a highly-polished recording-surface, which improves the articulation of the phonograph, and also has its bore accurately tapered, so as to fit the cylindrical phonogram-carrier of the phonograph.

What I claim is—

1. The process of making wax phonogram-blanks, consisting in first molding the blank from melted wax and then pressing the blank in a polished die, substantially as set forth.

2. The process of making cylindrical wax phonogram-blanks, consisting in first molding the cylindrical blank from melted wax and then pressing the blank both externally and internally in a polished die, substantially as set forth.

This specification signed and witnessed this 30th day of January, 1888.

THOS. A. EDISON.

Witnesses:
WILLIAM PELZER,
E. C. ROWLAND.